(12) United States Patent
Battaglia et al.

(10) Patent No.: US 7,150,105 B1
(45) Date of Patent: Dec. 19, 2006

(54) ADAPTOR FOR USE IN VEHICLE WHEEL ALIGNMENT

(75) Inventors: Douglas Battaglia, Gahanna, OH (US); Scott Frishman, Cropwell, AL (US); Jon Midgley, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/033,907

(22) Filed: Jan. 12, 2005

(51) Int. Cl.
*G01B 5/255* (2006.01)

(52) U.S. Cl. .................................... 33/203.18

(58) Field of Classification Search .. 33/203.18–203.2; 356/139.09
See application file for complete search history.

(56) References Cited

U.S. PATENT DOCUMENTS

| | | | |
|---|---|---|---|
| 3,402,905 A | 9/1968 | MacMillan | |
| 3,624,915 A | * 12/1971 | Wilkerson | 33/203.18 |
| 3,990,666 A | * 11/1976 | Morrison et al. | 33/203.21 |
| 4,185,917 A | 1/1980 | Alsina | |
| 4,285,136 A | 8/1981 | Ragan | |
| 4,337,581 A | * 7/1982 | Eck | 33/203.18 |
| 4,363,175 A | 12/1982 | Hedahl | |
| 4,377,038 A | * 3/1983 | Ragan | 33/203.18 |
| 4,534,115 A | 8/1985 | Kashubara | |
| 4,803,785 A | 2/1989 | Reilly | |
| 4,815,216 A | 3/1989 | Swayne | |
| 5,024,001 A | 6/1991 | Borner et al. | |
| 5,048,192 A | 9/1991 | Pascoal | |
| 5,056,231 A | 10/1991 | Alusick et al. | |
| 5,179,784 A | 1/1993 | Kowis | |
| 5,242,202 A | 9/1993 | Ettinger | |
| 5,311,668 A | 5/1994 | Longa et al. | |
| 5,446,967 A | 9/1995 | Gender | |
| 5,625,953 A | 5/1997 | Healy et al. | |
| 5,987,761 A | 11/1999 | Ohnesorge | |
| 6,131,293 A | 10/2000 | Maioli et al. | |
| 6,282,799 B1 | 9/2001 | Warkotsch | |
| 6,427,346 B1 | 8/2002 | Stieff et al. | |
| 6,453,567 B1 | 9/2002 | Naruse | |
| 6,622,389 B1 | 9/2003 | Pellegrino | |
| 6,718,646 B1 | 4/2004 | Corghi | |
| 2002/0170195 A1 | 11/2002 | Corghi | |

* cited by examiner

*Primary Examiner*—Christopher W. Fulton
(74) *Attorney, Agent, or Firm*—Standley Law Group LLP

(57) ABSTRACT

An adaptor assembly for securing a wheel alignment device to a wheel, especially a vehicle wheel. The adaptor of the present invention allows such a device to be secured to a vehicle wheel even if the wheel is substantially flangeless in design. The adaptor assembly includes a collar that releasably engages an adaptor pin portion of a wheel alignment device. The collar allows the adaptor assembly to rotate about an axis defined by the adaptor pin. A wheel contacting means is connected to the collar by a plate member. Once installed to a wheel, an outward movement of wheel alignment device extension arms to which the adaptor pins are attached causes the wheel contacting means to be forced against a wall of the wheel, thereby causing a self-centering of the wheel contacting means and a securing of the wheel alignment device to the wheel.

26 Claims, 4 Drawing Sheets

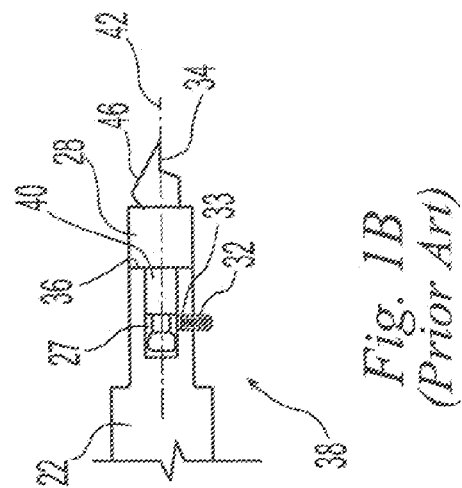
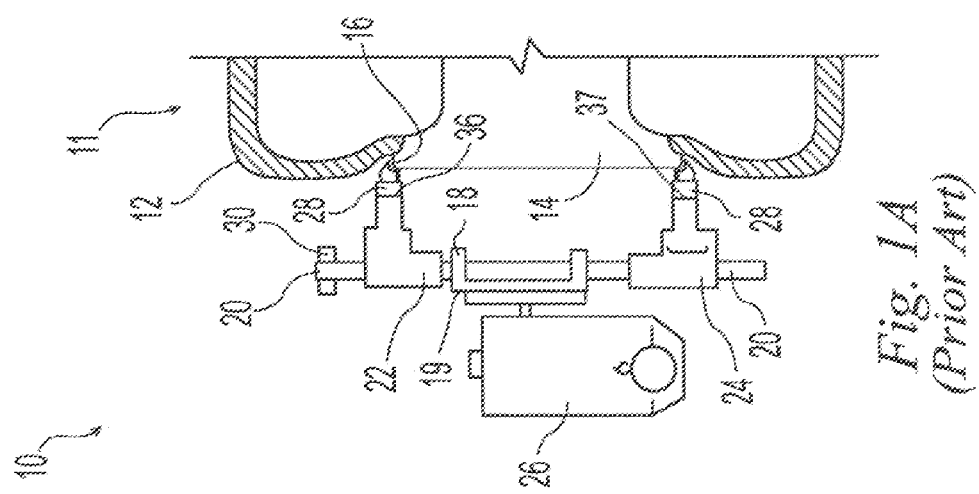
Fig. 1B
(Prior Art)
Fig. 1A
(Prior Art)

ADAPTOR FOR USE IN VEHICLE WHEEL ALIGNMENT

FIELD OF INVENTION

This invention relates to a wheel engaging adaptor, primarily for use with a flangeless vehicle wheel rim and tire assembly. More particularly, this invention relates to such an adaptor that can be used to secure a vehicle wheel alignment assembly to a flangeless vehicle wheel such as, for example, a Michelin® PAX® System vehicle wheel.

BACKGROUND OF THE INVENTION

In general, a vehicle wheel alignment assembly is used to ensure that the wheels of a vehicle are substantially parallel to each other, and also perpendicular to the ground. Depending on the vehicle, only the front wheels may be involved in such an operation, or all four of the wheels may be involved.

A variety of different and specific measurements may be checked during an alignment operation. These measurements may include camber and caster angle, and toe-in/toe-out angles, among others. Camber angle refers to the angle of the wheel when viewed from the front of the vehicle. If the wheel has a neutral or zero camber, it will appear to be substantially perpendicular to the ground. If the top of the wheel is leaning out (away from the vehicle), it is considered to have a positive camber. If the top of the wheel is leaning in (toward the vehicle), it is considered to have a negative camber. Too much of a positive or a negative camber can cause excessive wear to the outside or the inside of the tire, respectively.

Caster angle relates to the pivot axis on which the wheels rotate when turned by the steering wheel. Typically, the pivot axis is defined by a line drawn from an upper ball joint to a lower ball joint of the vehicle's suspension system. The caster angle, measured in degrees, is the angle between the pivot axis, projected on a vertical longitudinal plane (side view), and a line perpendicular to the ground.

Toe-in/toe-out involves the parallel relationship between associated wheels (i.e., front wheels or rear wheels) of a vehicle. When the toe-in and toe-out angle is zero, the respective front wheels or rear wheels will be parallel to each other. When the distance between the front portions of a respective pair of wheels is less than that between the rear portions of the wheels, toe-in is said to exist. When the distance between the rear portions of a respective pair of wheels is less than that between the front portions of the wheels, toe-out is said to exist. Too much toe-in can cause rapid wear to both tires.

The wheels of a new vehicle are properly set at the factory. However, typical driving can cause these settings to eventually change, resulting in misalignment. This misalignment can result simply from wear to a vehicle's suspension components, from movement of the suspension components due to rough roads, from damage to the suspension components (e.g., as a result of an accident), or from any combination thereof. Consequently, it is generally necessary that the alignment of a vehicle's wheels be periodically checked and, if necessary, adjusted. Misaligned wheels may cause premature and/or improper vehicle tire wear, and may also adversely affect the handling characteristics of the vehicle.

Therefore, various types of vehicle wheel alignment measurement devices and techniques have been developed over the years. One particular alignment technique involves attaching a vehicle wheel alignment assembly directly to a wheel of a vehicle. More than one such assembly can be used at one time, such that a pair of wheels can be checked simultaneously. These assemblies typically support one or more sensors that are used to check the various wheel settings.

Commonly, these assemblies are clamped to the circumferential flange present on the front of most vehicle wheels. This flange exists at the meeting point between the outer circumference of the wheel and the tire mounted thereto. To this end, different types of vehicle wheel clamping devices have been developed to secure these vehicle wheel alignment assemblies and the associated sensors that are utilized during an alignment procedure. A plurality of such devices are shown in U.S. Pat. No. 6,427,346 to Stieff et al. Similar devices are shown in U.S. Pat. No. 4,815,216 to Swayne and U.S. Pat. No. 4,285,136 to Ragan.

Unfortunately, these prior art devices suffer from various disadvantages that limit their effectiveness when used with certain tire and wheel design alternatives. For example, some modern tire and wheel designs do not always permit access to the outer periphery of the vehicle wheel rim after its assembly to the tire. The Michelin® PAX® System tire and wheel design is an example where the outer periphery of the rim is not exposed.

Certain of the prior art devices mentioned above could potentially be utilized with such a wheel rim style if the clamp fingers thereof were rotated to contact an inner face of the vehicle wheel rim. However, if used in this manner, there is a high likelihood that an inner surface of the wheel rim would be damaged, thus creating an undesirable appearance condition for the vehicle wheel.

Therefore, there exists a need in the art for a vehicle wheel alignment clamping device having clamping members which are useable with a wheel rim design that does not have an exposed outer rim periphery, wherein the clamping members will not damage an appearance face of the vehicle wheel rim, and wherein the clamping members allow the clamping device to be securely attached to the vehicle wheel. The adaptor of the present invention satisfies this need.

SUMMARY OF THE INVENTION

The present invention is directed toward a clamping member or adaptor and a method for securely attaching a vehicle wheel alignment assembly to a vehicle wheel rim therewith. The vehicle rim may have a flange, or may be substantially flangeless, such as the Michelin® PAX® System wheel mentioned above. The present invention may provide an assembly including a collar, a plate, upper and lower flange nuts, a lockable ball stud, and a rim protector. The collar may be cylindrical, and has a receiving hole for an adaptor pin and an upper and lower face. The upper face mounts in an abutting relationship to an adaptor pin retainer, and shares a longitudinal axis common to the adaptor pin. The lower face of the collar mounts in abutting relationship to the plate. The plate has an upper and lower surface (side), and preferably has a slotted through-hole along its length. The slotted hole receives a wheel contacting means, such as the ball stud, which may be adjustably attached by the upper and lower flange nuts. A rim protector may be attached to the lower side of the plate. When in use, the ball stud and rim protector lock against the wheel in a secured relationship, without exposing the outer wheel rim face to damage.

The adaptor of the present invention may be used with a novel vehicle wheel alignment assembly, or with a known device. For example, the adaptor of the present invention may be used in conjunction with the Self-Centering Wheel Adaptor manufactured by Hunter Engineering in St. Louis, Mo.

BRIEF DESCRIPTION OF THE DRAWINGS

FIG. 1A shows a partial sectional view of a known wheel clamping device portion of a vehicle wheel alignment assembly mounted on a vehicle wheel;

FIG. 1B shows a detailed sectional view of a known detachable clamp finger for use with a clamping device like that shown in FIG. 1;

DETAILED DESCRIPTION OF EXEMPLARY EMBODIMENTS

Figure 2:
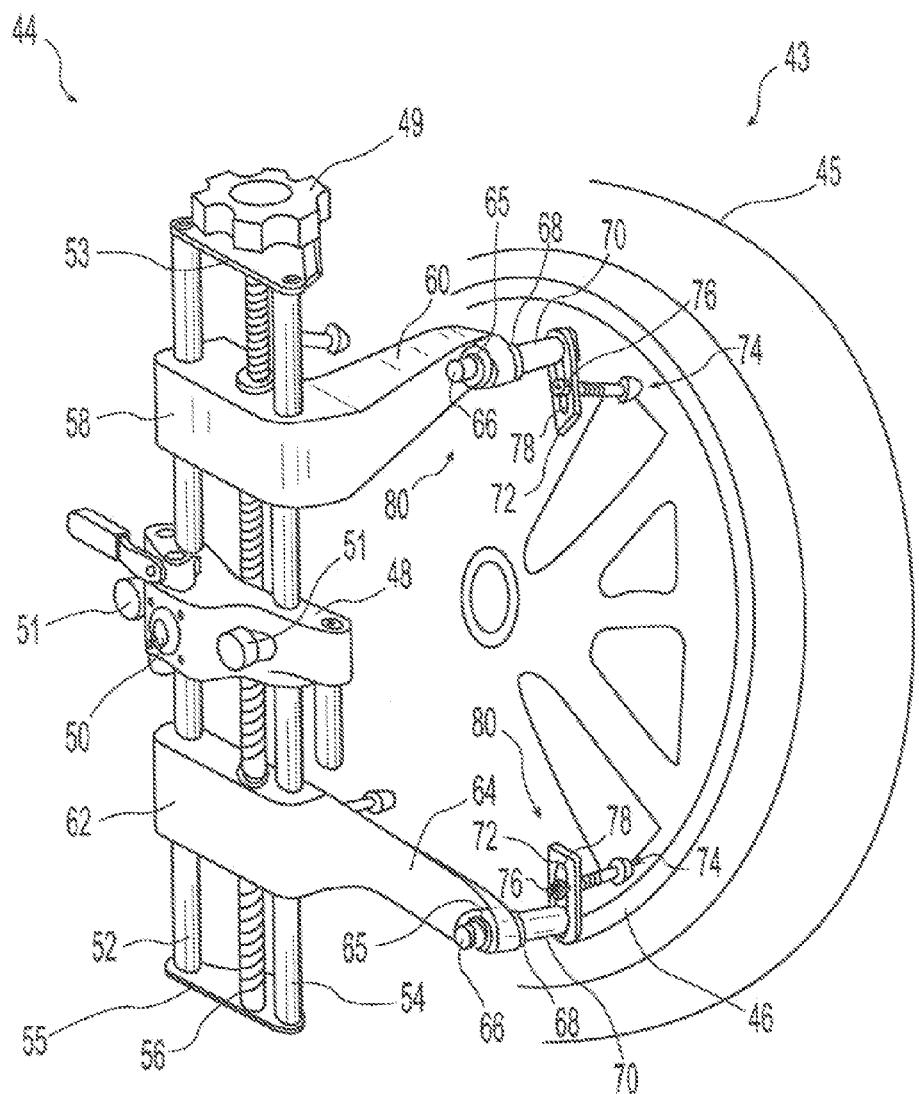
FIG. 2 shows a perspective view of a wheel rim adaptor assembly embodying the present invention mounted to a clamping device that is affixed to a vehicle wheel.

A generally known type of wheel clamping device for use with a vehicle wheel alignment apparatus can be observed in FIGS. 1A and 1B. As shown, the clamping device 10 is attached to a vehicle wheel, generally shown as 11, which includes a centrally located wheel rim 14 and tire 12. The vehicle clamping device 10 has a plurality of guide rods or shafts 20—preferably two. The guide rods 20 are held in a parallel relationship with respect to each other via a plurality of receiving members 18, 22, 24 through which the guide rods pass. The upper receiving member 22 is slidably positioned along an upper portion of guide rods 20. The upper receiving member 22 includes a clamping knob 30 by which the upper receiving member 22 may be selectively locked into position by an included locking means, such as the locking means described in U.S. Pat. No. 4,285,136 to Ragan. The central receiving member 18 may be slidably positioned along the central portion of guide rods 20 and locked into position along the guide rods 20 by another suitable clamping means (such as shown in the Ragan patent). The lower receiving member 24 may be fixedly secured to guide rods 20. The central receiving member 18 includes a mounting face 19 to which a sensing unit 26 may be removeably attached utilizing any appropriate fastening technique known in the art. In addition to having apertures for receiving the guide rods 20, the upper and lower receiving members 22, 24 also include respective extension arm pairs 36, 37 that are adapted to receive a plurality of detachable clamp finger bodies 28. The clamp finger bodies 28 are used to secure the clamping device 10 to the wheel rim 14.

A detailed view of one of a plurality of detachable clamp finger assemblies, generally labeled 38, can be observed in FIG. 1B. This clamp finger assembly 38 includes a stud portion 40 that is removably but securely mounted in a corresponding hole 27 in each of the extension arms 36, 37 of the upper and lower receiving members 22, 24. A clamp finger body 28 is connected to the stud portion 40. The stud portion 40 acts in conjunction with the hole 27 in the extension arm 36 to define a rotation axis 42 around which each clamp finger body 28 may rotate.

A frictionally inhibited rotation of finger body 28 is enabled through the engagement between the stud member 40 and the hole 27. A threaded hole 33 can be utilized in upper receiving member 22 to accept a threaded set screw 32 which prevents removal of finger body 28 while permitting rotation about the rotation axis 42 when a minimum threshold force is overcome.

The clamp finger body 28 also includes a finger extension 46 which has a gripper portion 34 at a distal end thereof for contacting the rim 14 of the vehicle wheel during use of the device. The rotatability of the clamp finger body 28 permits the finger extension 34 to align itself and contact the outer periphery (flange) 16 of the wheel rim 14, as shown in FIG. 1A.

in certain other known wheel alignment devices, such as the device shown in FIG. 1 of U.S. Pat. No. 6,427,346 to Stieff et al., a protruding stud may be provided on each extension arm of the device. In this case, a clamp finger body may have a hollow interior that is designed to receive the stud, as opposed to a stud member that is provided for insertion into a hole. An adaptor assembly of the present invention can be designed for use with either type of device.

Figure 3:
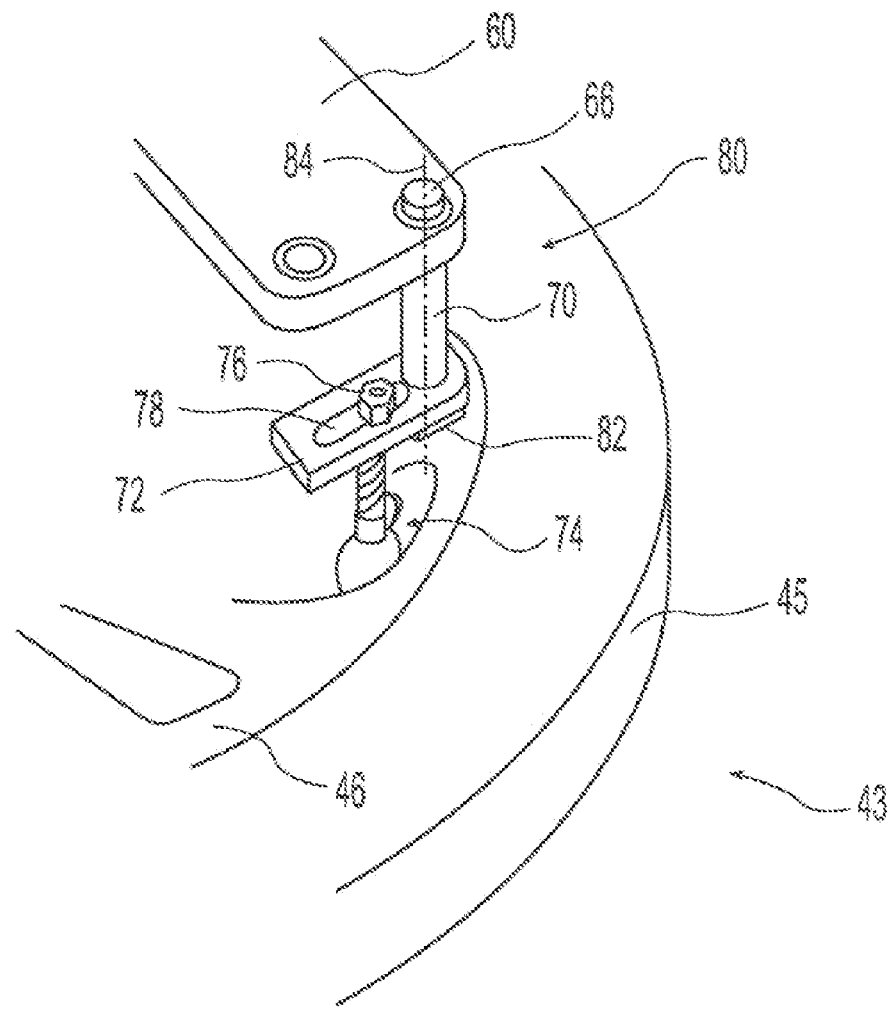
FIG. 3 shows a partial perspective view illustrating a close-up of the wheel rim adaptor assembly of FIG. 2 mounted to a vehicle wheel.
Figure 4:
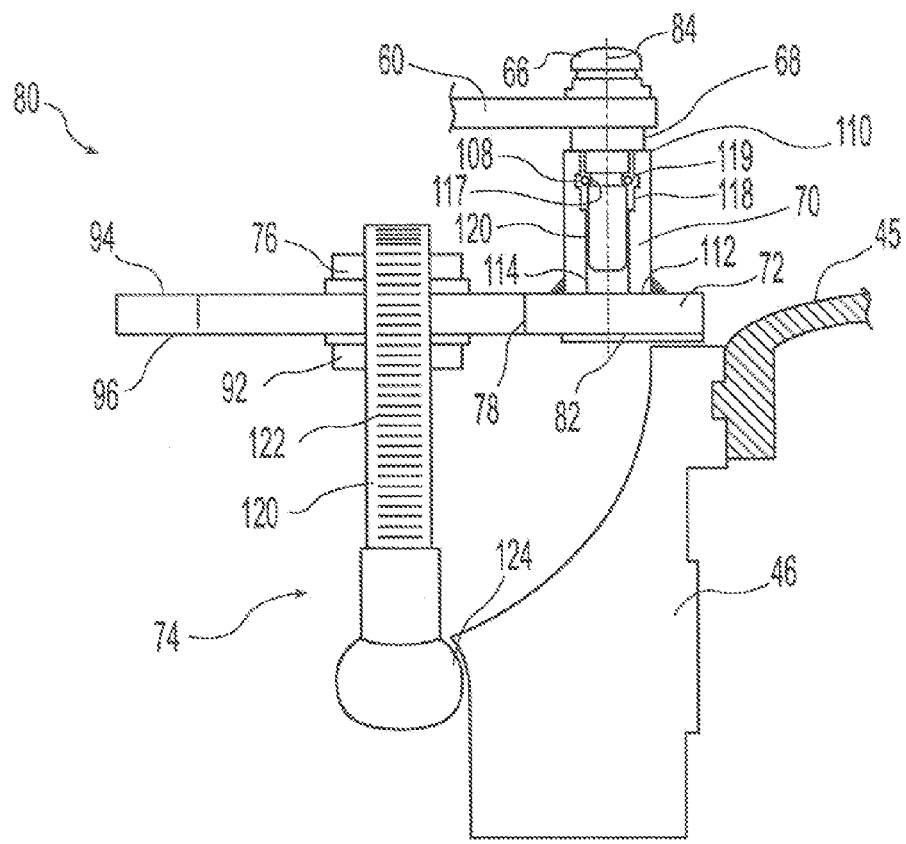
FIG. 4 shows a sectional view of the wheel rim adaptor assembly of FIG. 2 engaging the vehicle wheel rim.
Figure 5:
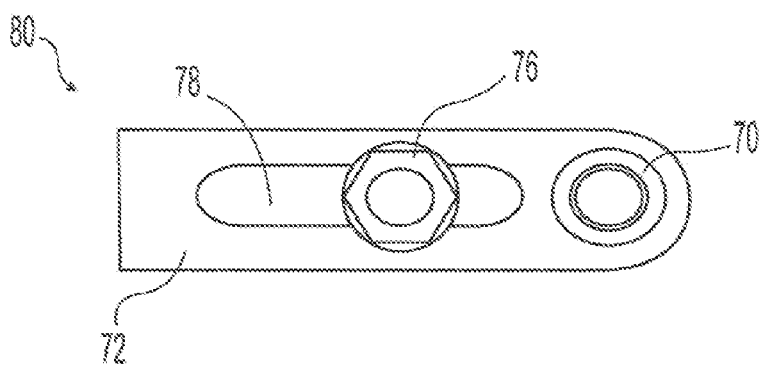
FIG. 5 shows a top plan view showing the wheel rim adaptor assembly of FIG. 2.

Unfortunately, as discussed briefly above, certain wheel designs may not have a flange with which the finger extension 34 of the clamp finger body 28 can be engaged. Rather, as shown in FIGS. 2–4, these wheels may be of flangeless design; meaning that the outer periphery of the wheel is substantially flush with the outer surface of the tire. An example of such a wheel is a Michelin® PAX® System wheel. An adaptor assembly of the present invention allows a clamping device such as that depicted in FIGS. 1A and 1B, or a similar clamping device, to be properly and securely affixed to a wheel of substantially flangeless design—without causing damage to the wheel With reference to FIG. 2, one embodiment of an adaptor assembly 80 of the present invention is shown to be attached to an exemplary wheel alignment unit assembly 44. This particular wheel alignment unit assembly 44 may be identical or similar to the clamping device of FIGS. 1A and 1B, but could be of a dissimilar design as well. When the wheel alignment unit assembly 44 is identical to the clamping device of FIGS. 1A and 1B, the adaptor assembly of the present invention may be installed thereto using the existing holes 27 in the extension arms 36, 37 thereof. An adaptor assembly 80 of the present invention can be easily installed to the previously mentioned Self-Centering Wheel Adaptor manufactured by Hunter Engineering in St. Louis, Mo. In this case, a portion of the adaptor assembly 80 is adapted to mate with a standard stud that extends from an extension arm portion thereof and is normally used to receive a clamping finger body similar to that described above.

The wheel alignment unit assembly 44 is removably affixed to a vehicle wheel 43, which includes a centrally located wheel rim 46 and tire 45. This particular embodiment of the wheel alignment device 44 includes guide rods 52, 54 mounted parallel with respect to each other, and in a spaced apart relationship. Attached at upper and lower ends of the guide rods 52, 54 are stopper plates 53, 55. The stopper plates 53, 55 not only serve to limit travel of internal receiving components, but also serve to keep the guide rods 52, 54 in an accurate parallel and spaced apart relationship.

A threaded rod 56 is mounted parallel to the guide rods 52, 54 and located therebetween. The stopper plates 53, 55 contain openings through which the threaded rod 56 passes.

Intermediate the ends of the guide rods 52, 54 is positioned an upper receiving member 58, a central receiving member 48, and a lower receiving member 62. Each receiving member contains a plurality of holes through which guide rods 52, 54 pass. The upper and lower receiving members 58, 62 also contain internally threaded holes, thus allowing for threaded engagement with threaded rod 56.

A knob 49 is coupled to one end of the threaded rod 56. Upon rotation of the knob 49, a corresponding inward or outward movement of the upper and lower receiving members 58, 62 will result. The central receiving member 48 may also contain manually rotatable knobs 51 to allow for fixing or releasing the position of the central receiving member along the length of the guide rods 52, 54. The central receiving member also preferably includes a sensing unit receiving face 50 for removably attaching a sensing unit (not shown) that is used to measure various vehicle wheel settings (such as, for example, camber or caster).

Each of the upper and lower receiving members 58, 62 includes a respective pair of extension arms 60, 64 (only one of each shown). The extension arms 60, 64 are provided to mate with the hardware that is used to secure the wheel alignment unit assembly 44 to the vehicle wheel. Each extension arm 60, 64 is preferably provided with a through-hole 65 for receiving an adaptor pin 66 that is used to secure the adaptor assembly 80 of the present invention thereto.

A clamping member or wheel rim adaptor assembly 80 of the present invention is illustrated in FIGS. 2–5. An adaptor assembly 80 is shown to be installed to each extension arm of the wheel alignment unit assembly 44 in FIG. 2. As shown, when properly installed a portion of the adaptor assembly 80 will contact an inner surface of the wheel 46.

As can be best observed by reference to FIGS. 3 and 4, an adaptor pin 66 is received within the above-mentioned extension arm hole 65 and is held securely therein by a retainer 68. The adaptor pin 66 defines a longitudinal axis 84 about which the adaptor assembly 80 may rotate. The adaptor pin 66 may be of various design, but in any event should be adapted to removably retain a mating portion of adaptor assembly 80, as described in more detail below. When the wheel alignment unit assembly 44 is the Hunter Self-Centering Wheel Adaptor, or another similar and commercially available device, the adaptor pin may be the standard stud that is typically used to secure a clamp finger body type element thereto. In contrast, the adaptor pin 66 may be a specialized element.

The adaptor assembly 80 of the present invention is designed to be removably attached to the adaptor pin 66 protruding from each extension arm 60, 64 of the upper and lower receiving members 58, 62. More specifically, the adaptor assembly 80 includes a plate 72, to which is attached a sleeve or collar 70 and a wheel contacting element 74. The collar 70 is provided to mate with a corresponding adaptor pin 66. The wheel contacting element 74 is provided to mate with the wheel 46 and to center and secure the wheel alignment unit assembly 44 thereto.

The plate 72 has an upper surface 94, and a lower surface 96. The collar 70 extends from the upper surface of the plate 72 toward the adaptor pin 66. The collar 70 is attached at lower face 112 thereof to the plate 72 by welding or another appropriate fastening technique. The wheel contacting element 74 typically passes through a slotted hole 78 which runs along the length of plate 72. This arrangement allows the adaptor assembly 80 to be adjusted to fit wheels of various diameter. Alternatively, the wheel contacting element 74 may be fixed to the plate, such as by threaded engagement, welding, or any other suitable fastening technique.

The collar 70 is of some length that is appropriate to receive and properly engage the adaptor pin 66 used. As stated above, the collar 70 preferably provides for removable engagement with the adaptor pin 66, while simultaneously allowing for rotation thereabout. As such, there are numerous known methods by which the collar 70 may be retained on the adaptor pin 66. In the particular embodiment shown, however, the collar 70 is retained on the adaptor pin 66 via frictional engagement that is enhanced by use of an o-ring 108.

As can be best observed in FIG. 4, the adapter pin 66 has a lower portion 120 that extends beyond the retainer 68 and is provided to enter the collar 70. The lower portion 120 of the adaptor pin 66 is provided with an o-ring groove 117 that is adapted to retain the o-ring 108. The o-ring groove 117 and the o-ring 108 may reside at various locations along the length of the adaptor pin 66 in order to engage a corresponding feature of the collar 70, when present.

The collar 70 may be of various cross-sectional shape, including the circular cross-section shown. The collar 70 includes an internal bore 114 that allows for entry of the adapter pin 66. The collar 70 may also have a counter-bore 118, as shown, in which case, the adaptor pin 66 may or may not have a lower portion 120 of multiple diameters. An o-ring engaging groove 119 may also be provided within the bore 114 of the collar 70 and be positioned to engage the o-ring 108 when the adaptor pin 66 is inserted into the collar 70. The combination of the o-ring 108, the o-ring engaging groove 119, and the tolerance relationship between the lower portion 120 of adaptor pin 66 and the bore 114, allows the collar to be frictionally (but removably) retained on the adaptor pin while permitting simultaneous rotational movement of the adaptor assembly 80 about the rotation axis 84 formed thereby. Obviously, other retention means could also be employed to engage the groove 117 in the adaptor pin 66 and retain the collar 70 thereon. Such retention means may include, without limitation, a spring loaded ball or a set screw. As best observed in FIG. 4, when the collar 70 is properly installed to the adaptor pin 66, an upper face 110 of the collar substantially abuts the retainer 68, while the lower face 112 abuts the upper surface 94 of the mounting plate 72.

The wheel contacting element 74 may be comprised on a number of different pins or other devices which can be safely contacted with the wheel 46. As stated above, the wheel contacting element 74 may be either adjustably or fixedly attached to the plate 72. In the embodiment of the adaptor assembly 80 depicted in FIGS. 2–4, however, the wheel contacting element 74 is shown to be a ball stud that is adjustably attached to the slotted plate 72 by a pair of flange nuts 76, 92.

The ball stud 74, preferably includes a threaded portion 122 and an engaging (wheel contacting) member 124. The threaded portion 122 of ball stud 74 is received within the slot 78 and is fastened securely to the plate 72 using an upper flange nut 76 and a lower flange nut 92 (as best seen in FIG. 4), although other known fastening techniques may be employed. As can be best observed by reference to FIG. 5, which illustrates a top plan view of the wheel rim adaptor assembly alone, the combination of the slot 78 and flange nuts 76, 92 allows the ball stud 74 to be moved and secured at multiple locations along the length of the plate 72, thereby facilitating use of an adaptor-enabled wheel alignment unit assembly 44 with wheels of various diameter. The engaging member 124 provides a non-marring surface for contact with the wheel rim 46.

A rim protector 82 may be bonded or fastened to the lower surface 96 of the plate 72. The rim protector 82 is preferably made of felt but, alternatively, may be made of nylon, rubber, or other similar materials which would prevent damage to the wheel rim 46 during use.

Method of Use

During an alignment procedure, a wheel alignment sensor (not shown) is secured to the sensing unit receiving face 50 of the central receiving member 48. The central receiving member 48 may then be slidably positioned along the guide rods 52, 54. The knobs 51 may then be manually rotated to lock the sensing unit into the proper position along the guide rods 52, 54.

Each ball stud 74 may be slidably positioned along the length of the slot 78 to a proper position, and subsequently secured into position by tightening the upper and lower flange nuts 76, 92. In this manner, the ball studs 74 may be manually adjustable along the length of the slot 78 to accommodate various types or sizes of wheels. Additionally, ball stud height may be adjustable along its length by first loosening upper flange nut 76, and then rotating the lower flange nut 92 to the proper position along threaded portion 122. The desired outcome for this adjustment is to provide a secure holding force. This is accomplished by causing the engaging member 124 of the ball stud 74 to make contact with the wheel rim 46, in conjunction with the rim protector 82 (if present) abutting against the wheel rim, thus providing an effective holding or "positive locking" of the device to the wheel rim and in an appropriate orientation with respect to the rim face. More specifically, while the plate 72 (and the rim protector, if present) maintains the proper position of the wheel alignment unit assembly 44 above the wheel 46, an outward movement of the upper and lower receiving members 58, 62 and their associated extension arms 60, 64 via rotation of the knob 49, causes the ball studs 74 to be tightly pressed against a wall of the wheel, thereby securing the wheel alignment unit assembly thereto.

If no rim protector 82 is present, the bottom surface 96 of the plate 72 may contact the wheel rim 46 directly. In such a case, the plate 72 may be made from a material that is not likely to harm the surface of the wheel rim 46, such as a soft metal, plastic, or composite material, for example. Once the initial adjustment is made for a specific wheel rim, no further manual adjustment of the ball stud 74 should be necessary.

The upper and lower receiving members 58, 62 may thereafter be movably positioned along the guide rods 52, 54, either inwardly or outwardly, to allow the plurality of ball studs 74 to be inserted into the proper openings in wheel rim 46. As the upper and lower receiving members 58, 62 are movably positioned, the plurality of ball studs 74 will self-center by rotation about the rotation axis 84 caused by contact of the engaging member 124 with the wheel rim 46—thereby securing the wheel alignment unit 44 to the wheel rim 46.

For removal of the device 44, the upper and lower receiving members 58, 62 may be re-positioned, thus allowing a gap between the ball studs 74 and the wheel rim 46. The device 44 may then be removed from engagement with the wheel rim 46.

Additional advantages and modifications will readily occur to those skilled in the art. Therefore, the invention in its broader aspects is not limited to the specific details and illustrative examples shown and described herein. Accordingly, various modifications may be made without departing from the spirit and scope of the invention as defined by the appended claims and their equivalents.

What is claimed is:

1. An adaptor assembly for use in securing a wheel alignment device to a wheel during a wheel alignment procedure, said alignment device providing an adaptor pin defining a rotation axis, said adaptor assembly comprising:
   a collar, said collar having an opening therein for receiving said adaptor pin, a first end and a second end, said collar having a length extending from said first end to said second end;
   a plate member, said plate member having a first side and a second side, said collar attached at its second end to the first side of said plate member, said plate member further adapted for engagement with a separate wheel contacting means; and
   a wheel contacting means, said wheel contacting means having a first end and a second end, said first end affixed to said plate member, said second end of said wheel contacting means adapted to contact an inner wall of said wheel;
   wherein, when said collar is engaged with said adaptor pin, said wheel contacting means and a portion of said plate cooperate to effectively engage an inner wall of said wheel; and
   wherein engagement of said adaptor pin and said collar permits rotation of said wheel contacting means about said rotation axis upon contact with said inner wall of said wheel.

2. The adaptor assembly of claim 1, wherein said collar is removably retained on said adaptor pin by frictional contact therebetween.

3. The adaptor assembly of claim 2, further comprising an o-ring that increases frictional contact between said adaptor pin and said collar.

4. The adaptor assembly of claim 1, further comprising a slot through said plate member and running along the length thereof.

5. The adaptor assembly of claim 4, wherein said first end of said wheel contacting means is threaded and passes through said slot in said plate member, said wheel contacting means secured to said plate member with a pair of flange nuts.

6. The adaptor assembly of claim 5, wherein said wheel contacting means is a ball stud.

7. The adaptor assembly of claim 5, wherein a height of said wheel contacting means with respect to said plate member can be adjusted using said flange nuts.

8. The adaptor assembly of claim 1, further comprising a rim protector affixed to said plate member and located to reside between said plate member and said wheel during engagement of said wheel.

9. An adaptor assembly for use in securing a wheel alignment device to a vehicle wheel during a wheel alignment procedure, said alignment device having a plurality of extension arms, each extension arm having an adaptor pin extending therefrom and defining a rotation axis, said adaptor assembly comprising:
   a retention collar of some length and having a first end and a second end, said retention collar having an adaptor pin receiving bore extending from said first end, said second end of said retention collar adapted for connection to a plate member;
   a plate member, said plate member having a first side and a second side, said plate member attached along its first side to said second end of said retention collar, said plate member further having a slot passing there-through and extending along a length thereof, said slot provided to receive a first end of a separate wheel contacting element; and a wheel contacting element, said wheel contacting element having a first end adapted to pass through said slot in said plate member and to secure said wheel contacting element thereto, and a second end adapted to contact an inner surface of said wheel when said wheel alignment device is installed thereto;

wherein, an adaptor assembly is installed on each extension arm of said wheel alignment device by sliding said collar over said adaptor pin, engagement of said adaptor pin with said collar permitting rotation of said wheel contacting element about said rotation axis upon contact with said wheel; and wherein, with the position of said wheel alignment device above said wheel maintained by a portion of each said plate member, an outward movement of said extension arms with respect to a center of said wheel causes said wheel contacting element to be forced against an inner wall of said wheel, thereby securing said wheel alignment device thereto.

10. The adaptor assembly of claim 9, wherein said retention collar is removably retained on said adaptor pin by frictional contact therebetween.

11. The adaptor assembly of claim 10, further comprising an o-ring that increases frictional contact between said adaptor pin and said retention collar.

12. The adaptor assembly of claim 11, wherein said first end of said wheel contacting element is threaded and passes through said slot in said plate member, said wheel contacting element secured to said plate member with a pair of flange nuts.

13. The adaptor assembly of claim 12, wherein said wheel contacting element is a ball stud.

14. The adaptor assembly of claim 12, wherein a height of said wheel contacting element with respect to said plate member can be adjusted using said flange nuts.

15. The adaptor assembly of claim 9, further comprising a rim protector affixed to said plate member and located to reside between said plate member and said wheel during engagement of said wheel.

16. A method for securing a wheel alignment device to a vehicle wheel during a wheel alignment procedure, said alignment device having a plurality of extension arms, each extension arm having an adaptor pin extending therefrom and defining a rotation axis, said method comprising:

providing a collar of some length and having a first end and a second end, said collar having an adaptor pin receiving bore extending from said first end, said second end of said collar adapted for connection to a plate member;

attaching a plate member along a first side thereof to said second end of said collar;

providing a slot through said plate member, said slot extending along a length thereof and provided to receive a first end of a separate wheel contacting element;

passing said first end of said wheel contacting element through said slot in said plate member, and securing said wheel contacting element thereto, said wheel contacting element having a second end for contacting an inner wall of said wheel;

installing an adaptor assembly on each extension arm of said wheel alignment device by sliding said collar over said adaptor pin, engagement of said adaptor pin with said collar permitting rotation of said wheel contacting element about said rotation axis upon contact with said wheel;

initially mating said wheel alignment device to said wheel and using a portion of each plate member to maintain the position of said wheel alignment device above said wheel through contact therebetween; and subsequently causing an outward movement of said extension arms with respect to a center of said wheel, thereby forcing each wheel contacting element into contact with an inner wall of said wheel and securing said wheel alignment device thereto.

17. The method of claim 16, wherein said collar is removably retained on said adaptor pin by frictional contact therebetween.

18. The method of claim 17, further comprising providing an o-ring that increases frictional contact between said adaptor pin and said retention collar.

19. The method of claim 16, wherein said first end of said wheel contacting element is threaded and passes through said slot in said plate member, said wheel contacting element secured to said plate member with a pair of flange nuts.

20. The method of claim 16, wherein said wheel contacting element is a ball stud.

21. The method of claim 16, wherein a height of said wheel contacting element with respect to said plate member is adjusted using said flange nuts.

22. The method of claim 16, further comprising providing a rim protector affixed to said plate member and located to reside between said plate member and said wheel during engagement of said wheel by said wheel alignment device.

23. The method of claim 16, wherein said adaptor assembly is attached to an adaptor pin of a known wheel alignment device.

24. The method of claim 16, wherein said adaptor assembly is used to secure said wheel alignment device to a substantially flangeless wheel.

25. The method of claim 24, wherein said substantially flangeless wheel is a Michelin® PAX® System vehicle wheel.

26. An adaptor assembly for use in securing a wheel alignment device to a wheel during a wheel alignment procedure, said alignment device providing an adaptor pin defining a rotation axis, said adaptor assembly comprising:

a collar, said collar having an opening therein for receiving said adaptor pin, a first end and a second end, said collar having a length extending from said first end to said second end;

a plate member, said plate member having a first side and a second side, said collar attached at its second end to the first side of said plate member, said plate member further adapted for engagement with a wheel contacting means;

a slot through said plate member and running along the length thereof; and a ball stud secured to said plate member with a pair of flange nuts, said ball stud having a first end and a second end, said first end being threaded and passing through said slot in said plate member, said second end adapted to contact a portion of said wheel;

wherein, when said collar is engaged with said adaptor pin, said ball stud and a portion of said plate member cooperate to effectively engage said wheel; and wherein engagement of said adaptor pin and said collar permits rotation of said ball stud about said rotation axis upon contact with said wheel rim.

* * * * *